United States Patent [19]

Weinert

[11] 4,279,564

[45] Jul. 21, 1981

[54] PARALLEL ARM CLAMP HAVING IMPROVED ATTACHING ASSEMBLY FOR NARROW CLAMP ARMS

[75] Inventor: Harry F. Weinert, Portland, Oreg.

[73] Assignee: Cascade Corporation, Portland, Oreg.

[21] Appl. No.: 111,778

[22] Filed: Jan. 14, 1980

[51] Int. Cl.[3] ......................... B65G 65/04; B66F 9/18

[52] U.S. Cl. .................................... 414/621; 414/671; 414/667; 414/785

[58] Field of Search ............... 414/606, 618, 619, 620, 414/621, 622, 623, 664, 665, 667, 669, 671, 785

[56] References Cited

U.S. PATENT DOCUMENTS

| | | | |
|---|---|---|---|
| 2,782,066 | 2/1957 | Lord | 414/621 |
| 3,145,866 | 8/1964 | Farmer et al. | 414/785 |
| 4,185,944 | 1/1980 | Seaberg | 414/671 |

FOREIGN PATENT DOCUMENTS

| | | | |
|---|---|---|---|
| 694956 | 7/1953 | United Kingdom | 414/621 |

*Primary Examiner*—Lawrence J. Oresky
*Attorney, Agent, or Firm*—Chernoff & Vilhauer

[57] ABSTRACT

A parallel arm clamp assembly having longitudinally-movable elongate slide members mountable transversely on the front of a lift truck and attaching members for connecting relatively narrow opposing clamp arms to the ends of the slide members so as to extend perpendicular thereto. Each slide member has an elongate rear portion longitudinally mounted within a slide guide and a longitudinally-extending elongate front portion external of the respective guide protruding forwardly therefrom, the elongate front portions of the respective slide members intersecting a common plane extending vertically and longitudinally with respect to the slide members. The clamp arm attaching members each have a pair of legs formed monolithically and homogeneously into a single member with the legs oriented at substantially a 90° angle with respect to each other. One leg of each such member is connected in end-to-end abutment with a respective end surface of a respective front portion of a slide member so as to also intersect the aforesaid common plane. The second leg of each attaching member protrudes forwardly from the first leg and is adapted for end-to-end abutment with the rear edge of a respective clamp arm.

9 Claims, 6 Drawing Figures

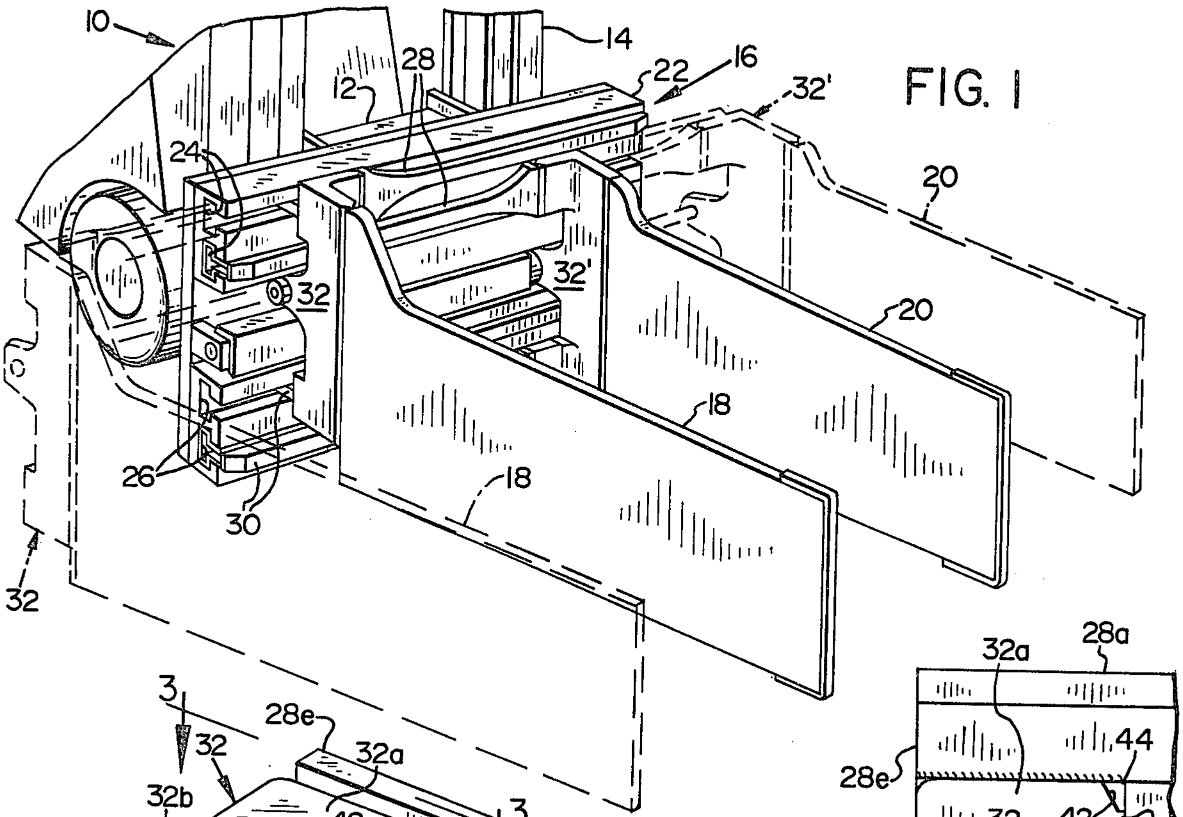
FIG. 1
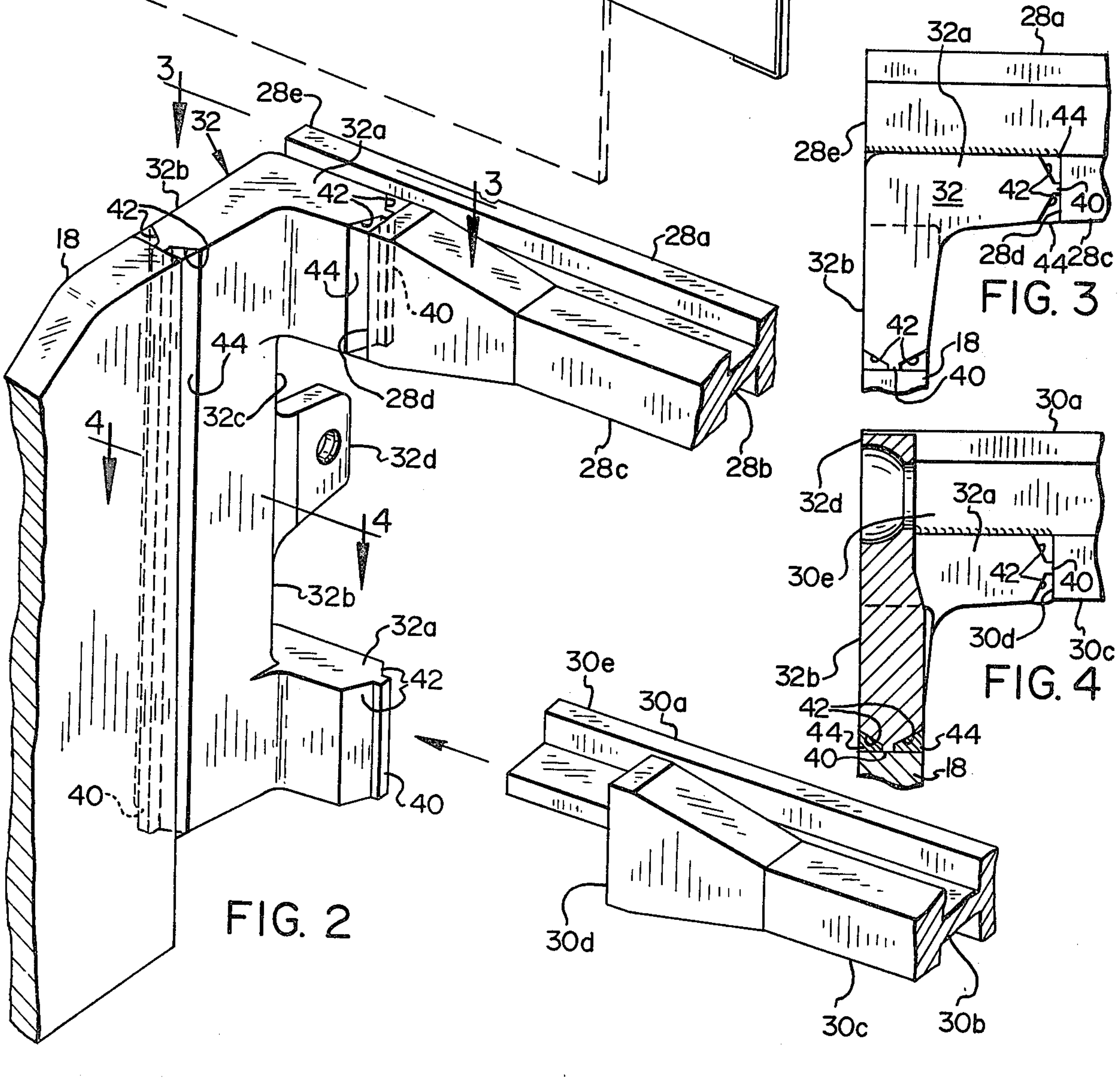
FIG. 2
FIG. 3
FIG. 4

PARALLEL ARM CLAMP HAVING IMPROVED ATTACHING ASSEMBLY FOR NARROW CLAMP ARMS

BACKGROUND OF THE INVENTION

This invention relates to improvements in load-handling implements for lift trucks wherein forwardly-protruding, selectively openable and closable opposed clamp arms are attached to the ends of transversely-oriented, longitudinally-movable elongate slide members mounted on a slide guide frame attached to a lift truck load carriage.

Stress concentrations are responsible for a high incidence of fatigue failures at the joint between the rear of such a forwardly-protruding clamp arm and the end of the respective slide member upon which the load arm is mounted. Such failures result from the cyclic application of primarily horizontal forces to the joint, caused by the load moment and clamping moment respectively. The load moment is the reactive moment exerted about a generally horizontal axis transverse of the lift truck by the weight of the forwardly-protruding load, causing the clamp arm to pull forwardly away from the truck at its top and push rearwardly toward the truck at its bottom. The clamping moment is the reactive moment exerted about a generally vertical axis by the clamping pressure on the load which tends to pivot the clamp arm laterally outward with respect to the end of the respective slide member upon which it is mounted.

In conventional structures utilizing tube-type slide guides, as shown for example in Ehmann U.S. Pat. No. Re. 23,694 and Saint U.S. Pat. No. 2,821,316, each slide member includes a metal connecting member of small cross section and length, compared to the cross section and length of the remainder of the slide member, welded to one end of the slide member and protruding forwardly therefrom attaching at its forward end to the rear of a clamp arm. The relatively small cross section and length, and the forward protrusion, of the welded connecting member is necessary because such member must communicate between the interior and the exterior of the tube-type slide guide through a narrow slot in the guide when the clamp arms are closed to a narrow position within the width of the clamp guide frame. This type of construction, which is also utilized in structures having tube-type guides of square or rectangular shape as shown for example in U.S. Pat. Nos. 2,609,114 and 2,746,630, introduces a high degree of susceptibility to failure from the above-described cyclically-applied horizontal forces at the welded joint because the protruding connecting member at the end of each slide member causes a relatively abrupt cross-sectional change horizontally in the slide member at the point where the weld occurs, thereby creating a stress concentration which is further aggravated by the lack of homogeneity in the metal caused by the weld at that point.

The above-described susceptibility to fatigue failure has been remedied in some previous clamps by providing large horizontally-extending gussets at the juncture between the slide member and clamp arm, as shown for example in U.S. Pat. Nos. 2,635,774, 2,870,929 and 2,956,700. However such gussets interfere with the handling of a rectangular load in the optimum position where the rear surface of the load is closely adjacent to the slide members. Attempting to hold a rectangular load in a more forward position where it does not interfere with the gussets is unsatisfactory since the greater forward tipping moment thus exerted by the load on the lift truck greatly reduces the load-carrying capacity and stability of the truck.

Still other clamp constructions have solved the aforementioned failure problem by providing slide members of substantially uniform horizontal cross-sectional dimension throughout their length, each having an elongate portion along the front thereof which is exterior of the slide guide to which the load arm may attach directly without the necessity of any small, welded, protruding connecting member. In the most pertinent previous construction of this type, which is disclosed in U.S. patent application Ser. No. 920,455, filed June 29, 1978, the clamp arm is bolted or welded directly to the front face of the elongate exterior portion of the slide member at one end thereof. This results in an extremely failure-resistant connection between the clamp arm and the slide member, provided that the rear end of the clamp arm where it connects to the face of the exterior portion of the slide member has substantial transverse thickness.

In some materials handling applications, however, it is impossible for clamp arms to have such substantial thickness at their rear ends. This is particularly true in cases where cartons or similar loads are stored with little space between them for insertion of the clamp arms. In such cases the clamp arms must be relatively narrow throughout their lengths as, for example, shown in Lord U.S. Pat. No. 2,782,065. However to accommodate such narrow clamp arms a plate extending inwardly perpendicularly from the rear end of each clamp arm must be provided, as in Lord, for mounting upon the face of the respective slide member at one end thereof. These plates, which must be of substantial thickness to resist the stresses imposed on the clamp arms, unfortunately prevent loads from being handled in a position abutting the face of the slide members. Rather each load must be handled in a forwardly-protruding position with its rear surface pushed forwardly from the face of the slide member and separated therefrom by the thickness of the aforementioned plate. Since most lift trucks which would utilize such a clamp are of the counterbalanced type, the front axle thereof serving as a fulcrum, any requirement that the load be positioned a spaced distance forwardly of the face of the slide members necessarily diminishes the counterbalanced load-carrying capacity of the lift truck because the forward distance between the center of gravity of the load and the front axle of the truck is thereby increased.

It should also be noted that the aforementioned plates cannot extend outwardly instead of inwardly from the clamp arms to eliminate the problem of limited rearward load position, since such plate would then merely strike the front surfaces of loads positioned on either side of the load being engaged during insertion of the clamp arms, thereby likewise limiting the rearward position of the load relative to the clamp arms.

Moreover the plates which cause such forward positioning of the load in applications requiring narrow clamp arms cannot be eliminated by dispensing with the plate and merely welding or bolting the rear ends of the narrow clamp arms at right angles to the ends of the slide members, since such right-angle joint is the point of maximum stress concentration imposed by the aforementioned clamping moments and any lack of homogeneity of material at this joint, caused by welding or bolting, would severely aggravate the stress concentration which would soon lead to fatigue failure.

Accordingly what is needed is a structure for mounting narrow clamp arms to slide members of the type having stress-resistant elongate front portions exterior of the slide guides, such clamp arm attaching structure permitting placement of the load in abutment with the exterior front portion of the slide member to maximize rearward positioning thereof and thus maximize load-carrying capacity of the truck, such clamp arm attaching structure also providing homogeneity of material at the right-angle junction between the clamp arm and slide member.

SUMMARY OF THE PRESENT INVENTION

The present invention satisfies the foregoing combined needs by utilizing a novel clamp arm attaching assembly in combination with slide members having elongate rear portions longitudinally movably mounted within respective guides and elongate front portions, extending longitudinally along the majority of the length of each slide member, external of the respective guides and protruding forwardly therefrom. The clamp arms are attached to the slide members by respective clamp arm attaching members, each having a pair of legs formed monolithically and homogeneously into a single member such that the legs are oriented at substantially a 90° angle with respect to each other, one leg of each attaching member being connected in end-to-end abutment with a respective end surface of an elongate front portion of a respective slide member and the other leg thereof protruding forwardly from the first leg for connection, preferably also in end-to-end abutment, with the rear end of a respective clamp arm. Preferably the forwardly-protruding legs of the clamp arm attaching members have vertical dimensions at least as great as the transversely-extending legs thereof, thereby ensuring against stress concentrations between the two legs which would be susceptible to vertical forces. In fact the forwardly-protruding leg most preferably has a substantially greater vertical dimension than the transversely-extending leg, and interconnects a pair of vertically-spaced transversely-extending legs which end-abut a pair of vertically-spaced parallel slide members. The clamp arm attaching members also have preformed weld preparations at the ends of the two legs for facilitating end-to-end welding of the legs to the slide members and clamp arms respectively. Despite the end-to-end interconnection of the clamp arm attaching members with the slide members, adjacent ones of the slide members are nonetheless longitudinally movable with respect to each other into such longitudinally-overlapping relation that narrow closability of the clamp arms to positions within the slide guide frame is obtainable.

Accordingly it is a principal objective of the present invention to provide a parallel arm clamp assembly having a clamp arm attaching structure for mounting narrow clamp arms to the ends of transverse slide members which permits placement of the load directly in abutment with the slide members to maximize load-carrying capacity of the truck while also providing right-angle joints between the narrow clamp arms and slide members which are totally homogeneous in their material and require no welds or bolts to form the right-angle joints which would otherwise make the joints susceptible to failure.

It is a further objective of the present invention to ensure that the forwardly-protruding portion of the attaching structure which connects to the clamp arm has a vertical dimension at least as great as the vertical dimension of the transversely-extending portion of the homogeneous attaching structure, thereby ensuring against stress concentrations which would be susceptible to vertical forces.

It is a further objective of the present invention to provide such attaching structure while retaining narrow closability of the clamp arms to positions within the guide frame of the slide members.

It is a further objective of the present invention to provide preformed weld preparations on the clamp arm attaching structure for facilitating end-to-end welding thereof to the slide members and clamp arms respectively.

The foregoing and other objectives, features and advantages of the invention will be more readily understood upon consideration of the following detailed description of the invention, taken in conjunction with the accompanying drawings.

BRIEF DESCRIPTION OF THE DRAWINGS

FIG. 1 is a perspective view showing a lift truck having an exemplary embodiment of the parallel arm clamp of the present invention mounted thereon.

FIG. 2 is an enlarged partial detail view of one of the clamp arm attaching structures and its associated clamp arm, shown in both attached and exploded relation respectively to a pair of slide members.

FIG. 3 is a top view taken along line 3—3 of FIG. 2.

FIG. 4 is a sectional view taken along line 4—4 of FIG. 2.

DESCRIPTION OF THE PREFERRED EMBODIMENT

Figure 6:
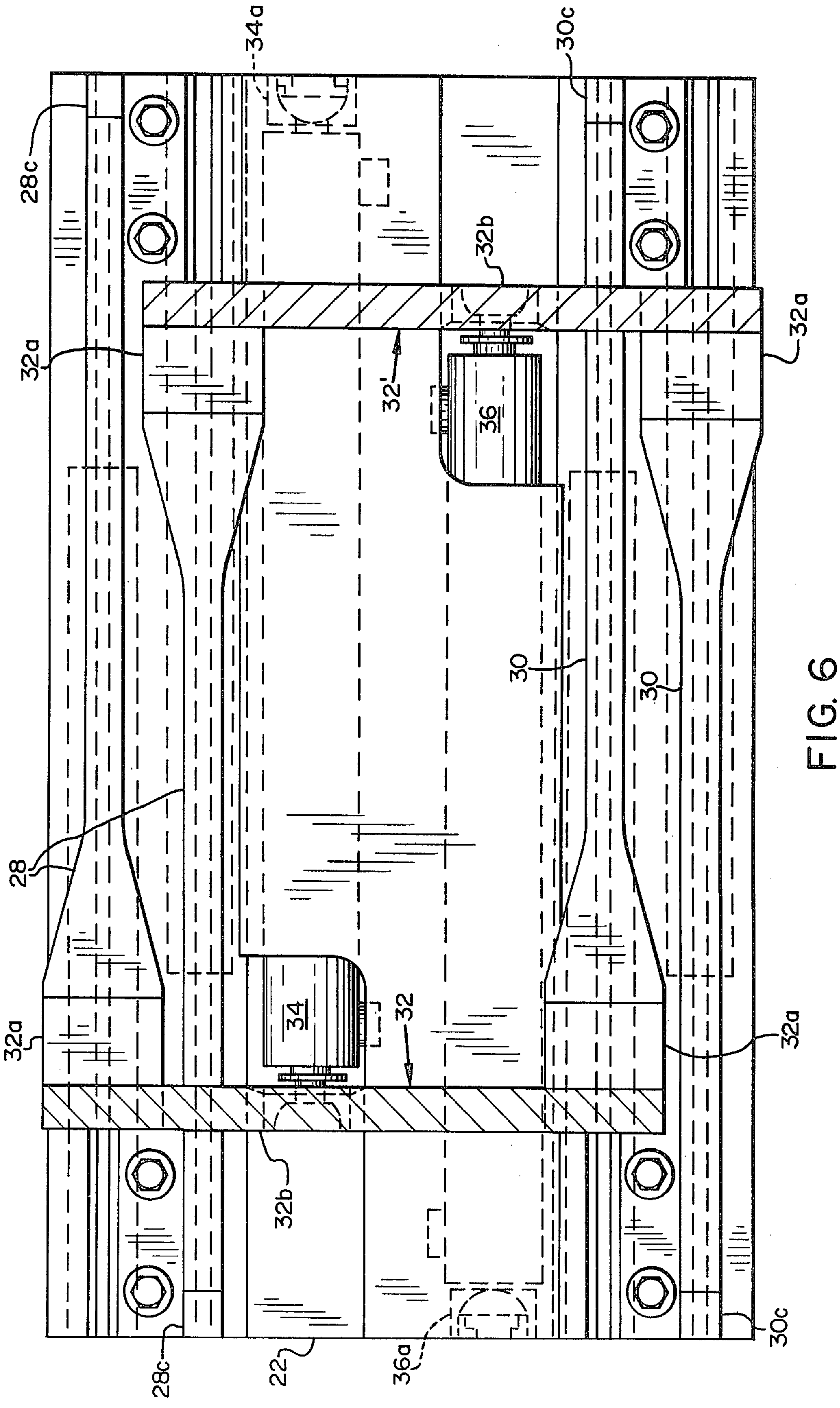
FIG. 6 is a sectional view taken along line 6—6 of FIG. 5.

With reference to FIG. 1, a typical lift truck 10 is shown having a selectively elevatable load carriage 12 mounted on a mast 14 at the front of the lift truck. A parallel arm clamp assembly, indicated generally as 16, is mounted on the load carriage 12 and has a pair of forwardly-protruding, transversely openable and closable clamp arms 18 and 20 mounted thereon. The assembly includes a slide guide frame 22, mounted vertically on the load carriage 12, having upper and lower pairs 24 and 26 respectively of elongate, parallel, vertically-spaced transverse slide guides thereon. Each pair of slide guides 24 and 26 mounts a respective pair 28 or 30 of elongate, parallel, vertically-spaced mutually-adjacent slide members. Each slide member of a pair is longitudinally movably mounted within a respective slide guide so as to be movable with respect to the guides alternately away from or toward the other slide member of the pair in a mutually-overlapping longitudinal relationship. As shown in FIG. 1, each of the upper slide members of the respective pairs 28, 30 has the clamp arm 18 rigidly mounted to one end thereof in a manner to be described more fully hereafter, while each of the lower slide members has the opposing clamp arm 20 mounted thereto. The slide members are movable toward or away from one another such that the ends of the slide members mounting the load arms are within the width of the slide guide frame 22 as shown in solid lines in FIG. 1 and FIG. 6 and are overlapped by the other slide member of the pair or, alternatively, such that the ends are exterior of the width of the slide guide frame 22 as shown in phantom in FIG. 1. This range of movement is necessary to enable the load-handling apparatus to engage loads of greatly varying width.

With reference to FIGS. 2-4, each slide member is of a modified horizontal I-beam configuration having a longitudinal rear portion 28*a* or 30*a* respectively, of substantially constant cross section throughout the length of the slide member, connected by a web 28*b* or 30*b* respectively to a longitudinal front portion 28*c* or 30*c* respectively external of the respective slide guide 24 or 26. Each front portion 28*c* or 30*c* has a respective end surface 28*d* or 30*d* located adjacent one longitudinal extremity thereof and also protruding forwardly from the respective slide guide, the respective end surfaces being located at opposite ends of each pair of slide members 28 and 30 respectively. As can best be seen in FIG. 5, the respective front portions 28*c* and 30*c* of the slide members, and the respective end surfaces 28*d* and 30*d* of the front portions, all intersect a common imaginary plane extending vertically and longitudinally with respect to the slide members the edge of such plane being indicated by the phantom line 31.

Attached to the end surface 28*d* or 30*d* of a respective slide member in end-to-end abutting relation with such end surface is a respective clamp arm attaching member 32 or 32'. Each clamp arm attaching member 32, 32' comprises a casting or forging having a first leg 32*a* and a second leg 32*b* (FIGS. 2-4) formed monolithically and homogeneously into a single member 32 with the legs oriented at substantially a 90° angle with respect to each other. Each leg 32*a* is oriented longitudinally with respect to the slide members and rigidly connected to end-to-end abutment with an end surface 28*d* or 30*d* so as to also intersect the aforementioned imaginary plane 31, the second leg 32*b* of the attaching member 32 protruding forwardly from the first leg 32*a*. The forwardly-protruding second leg 32*b*, as best seen in FIG. 2, has no vertical dimension smaller than the vertical dimension of the respective end surface of the slide member to which it is attached and preferably has a vertical dimension substantially greater than such end surface and extends vertically between a pair of first legs 32*a*, joining them together homogeneously into a single member 32. Two such members 32 and 32' are provided, one for attaching the clamp arm 18 to its respective slide members and one for attaching the clamp arm 20 to its respective slide members.

Figure 5:
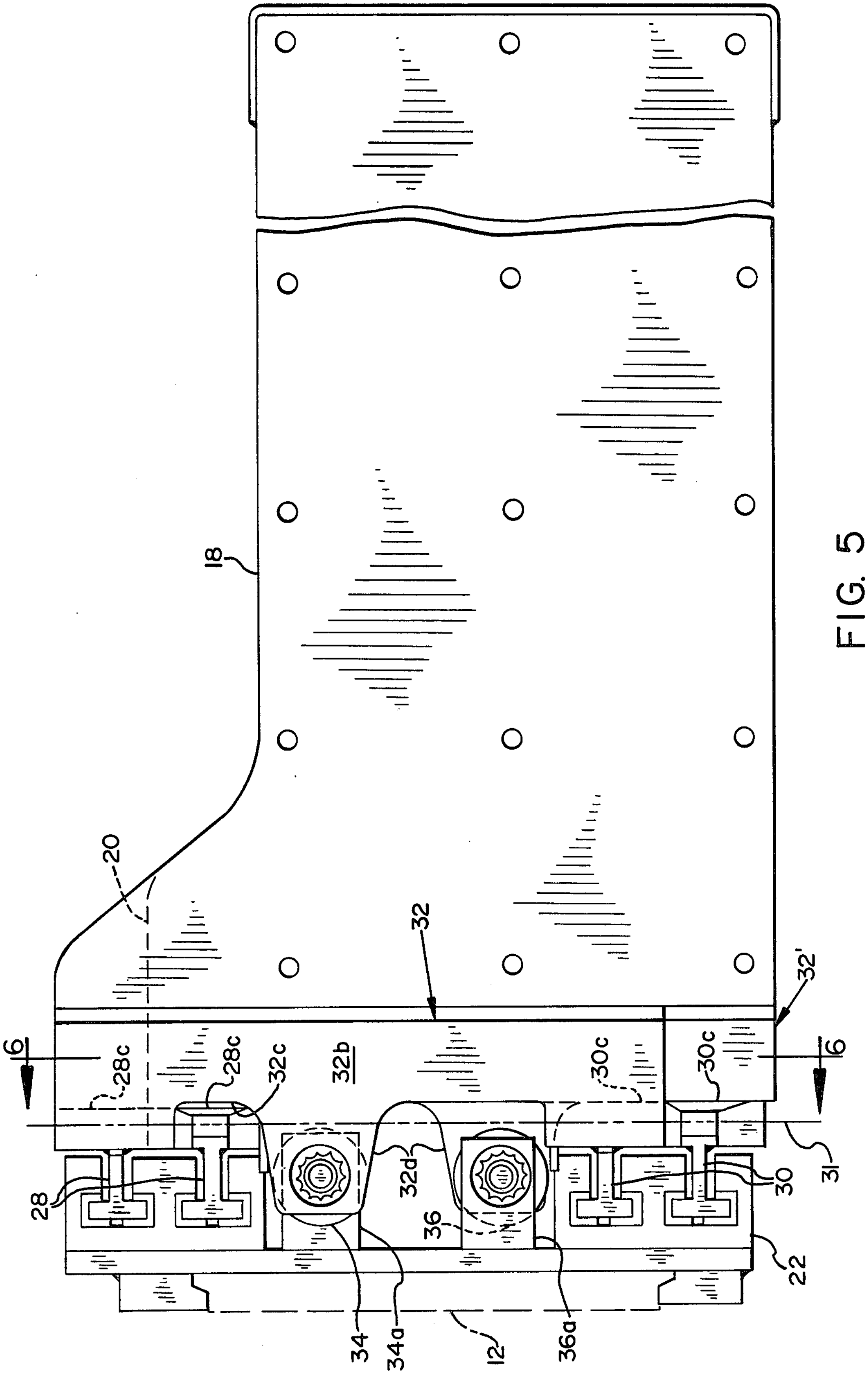
FIG. 5 is a side view of the parallel arm clamp of FIG. 1.

The legs 32*a* of the member 32 associated with clamp arm 18 (FIGS. 2-4) are connected in end-to-end abutment with the upper slide members of the respective pairs 28, 30, while the comparable legs 32*a* of the other member 32' are connected in end-to-end abutment with the lower slide members of the respective pairs. As best seen in FIG. 5 with respect to the attaching member 32, the rear edge of the forwardly-protruding second leg 32*b* in the region between the pair of first legs 32*a* has a rear edge with a depression 32*c* therein, the edge of which is positioned forwardly of and transverse to the elongate front portion of the lower one of the pair of slide members 28. The purpose of this depression 32*c* is to permit the front portion of the lower one of the pair of slide members 28 to pass behind the rear edge of the leg 32*b* to permit the pair of slide members 28 to move with respect to one another into such longitudinally-overlapping relation that the forwardly-protruding leg 32*b* is overlapped longitudinally by the front portion of the lower slide member 28. This overlapping relationship is necessary to bring the clamp arms close to one another within the width of the slide guide frame 22 into positions as shown in solid lines in FIG. 1 and in FIG. 6.

It should be noted that the other clamp arm attaching member 32', located on the opposite side of the clamp assembly, has the same structure as that of the clamp arm attaching member 32 just discussed, except that the member 32' is upside down. Thus the same depression 32*c* just described functions on the opposite clamp arm attaching member 32' to permit the front portion 30*c* of the upper slide member of the lower pair of slides 30 to pass behind the rear edge of the leg 32*b*.

Movement of the respective slide members away from one another or toward one another into the aforementioned longitudinally-overlapping relation is accomplished by means of double-acting hydraulic ram assemblies 34 and 36 respectively, the piston rods of the respective ram assemblies being connected to respective rearwardly-protruding portions 32*d* of the respective forwardly-protruding legs 32*b* of the clamp arm attaching members 32, 32'. The cylinder portions of the ram assemblies 34 and 36 are connected to the slide guide frame 22 by means of respective connecting members 34*a* and 36*a* respectively.

Each of the legs 32*a* of the respective clamp arm attaching members 32, 32' has a specially contoured connecting surface adapted for end-to-end abutment with a respective one of the end surfaces of the front portions of the slide members, and each of the forwardly-protruding legs 32*b* has a similar connecting surface adapted for end-to-end abutment with a respective one of the rear ends of the narrow clamp arms 18 and 20. The connecting surfaces are best seen in FIGS. 2-4 and each has a vertically-extending protruding central portion 40 and a pair of vertically-extending beveled portions 42 sloping away on both sides of the central portion. These connecting surfaces provide preformed weld preparations, when placed in end-to-end abutment with a slide member or clamp arm as the case may be, comprising notches into which a substantial amount of weld material 44 can be deposited to create an exceptionally strong, reliable joint without the need for time-consuming grinding or cutting operations to create such notches preparatory to welding.

Moreover the joint between each clamp arm attaching member 32, 32' and each respective slide member is considerably strengthened by providing the web and elongate rear portion of each of the slide members with a longitudinally-protruding section 28*e* or 30*e* respectively (FIGS. 2-4) extending longitudinally beyond the respective end surface 28*d* or 30*d* and rearwardly of a respective one of the legs 32*a* of an attaching member 32, 32', such longitudinally-protruding section being connected by welding to the rear side of such leg 32*a* at a location longitudinally beyond the end surface.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A load-handling structure adapted to be mounted on an elevatable load carriage at the front of a lift truck for operating transversely openable and closable clamp arms, said load-handling structure comprising:

(a) a slide guide frame, adapted to be mounted vertically on the load carriage, having at least a pair of elongate, parallel, vertically-spaced transverse slide guides thereon;

(b) a pair of elongate vertically-spaced slide members longitudinally movable alternatively toward or away from one another in a mutually-overlapping longitudinal relationship, each slide member having an elongate rear portion longitudinally movably mounted within a respective one of said guides, and a longitudinally-extending elongate front portion having a longitudinal axis substantially parallel to a plane extending vertically and longitudinally with respect to said slide members, each of said elongate front portions being external of the respective guide so as to protrude forwardly therefrom and being fixedly connected to said rear portion so as to move longitudinally in unison therewith, each of said elongate front portions having an end surface located adjacent one longitudinal extremity thereof and also protruding forwardly from the respective guide, said respective end surfaces being located at opposite ends of said pair of slide members and having respective vertical dimensions greater than the respective vertical dimensions of said front portions along a major part of their length;

(c) said respective end surfaces and said elongate front portions of both of said pair of slide members all being substantially aligned with one another parallel to said plane; and (d) a pair of clamp arm attaching members, each having a pair of legs formed monolithically and homogeneously into a single member with said legs oriented at substantially a 90° angle with respect to each other, and each having a first leg thereof connected in end-to-end abutment with a respective one of said end surfaces of said elongate front portions so that said respective first legs are also substantially aligned with each other parallel to said plane, the second leg thereof protruding forwardly from the first leg thereof.

2. A load-handling structure adapted to be mounted on an elevatable load carriage at the front of a lift truck for operating transversely openable and closable clamp arms, said load-handling structure comprising:

(a) a slide guide frame, adapted to be mounted vertically on the load carriage, having at least a pair of elongate, parallel, vertically-spaced transverse slide guides thereon;

(b) a pair of elongate vertically-spaced slide members longitudinally movable alternatively toward or away from one another in a mutually-overlapping longitudinal relationship, each slide member having an elongate rear portion longitudinally movably mounted within a respective one of said guides, and a longitudinally-extending elongate front portion having a longitudinal axis substantially parallel to a plane extending vertically and longitudinally with respect to said slide members, each of said elongate front portions being external of the respective guide so as to protrude forwardly therefrom and being fixedly connected to said rear portion so as to move longitudinally in unison therewith, each of said elongate front portions having an end surface located adjacent one longitudinal extremity thereof and also protruding forwardly from the respective guide, said respective end surfaces being located at opposite ends of said pair of slide members;

(c) said respective end surfaces and said elongate front portions of both of said pair of slide members all being substantially aligned with one another parallel to said plane; and (d) a pair of clamp arm attaching members, each having a pair of legs formed monolithically and homogeneously into a single member with said legs oriented at substantially a 90° angle with respect to each other, and each having a first leg thereof connected in end-to-end abutment with a respective one of said end surfaces of said elongate front portions so that said respective first legs are also substantially aligned with each other parallel to said plane, the second leg thereof protruding forwardly from the first leg thereof;

(e) said elongate rear portion of each of said pair of slide members having a longitudinally-protruding section extending longitudinally beyond said end surface of the respective elongate front portion of the respective slide member and rearwardly of a respective one of said first legs and being connected to said respective first leg at a location longitudinally beyond said respective end surface.

3. The load-handling structure of claim 1 or 2 including means for moving said slide members with respect to one another into such longitudinally-overlapping relation that each of said end surfaces and each of said first legs connected thereto are overlapped longitudinally in said plane by the elongate front portion of the other of said pair of slide members.

4. The load-handling structure of claim 3 wherein the forwardly-protruding second leg of each of said pair of clamp arm attaching members has no vertical dimension substantially smaller than the vertical dimension of the respective end surface of the elongate front portion to which the respective attaching member is connected.

5. The load-handling structure of claim 3 wherein the forwardly-protruding second leg of each of said pair of clamp arm attaching members has a vertical dimension greater than the vertical dimension of the respective end surface of the elongate front portion to which the respective attaching member is connected, and has a vertically-extending portion having a rear edge positioned forwardly of and transverse to the elongate front portion of the other of said pair of slide members so as to permit such front portion to pass behind said rear edge, further including means for moving said slide members with respect to one another into such longitudinally-overlapping relation that each of said vertically-extending portions of said second legs is overlapped longitudinally by the elongate front portion of the other of said pair of slide members.

6. The load-handling structure of claim 1 or 2, further including a pair of clamp arms each having a rear end, each of the second legs of said pair of claim arm attaching members being connected in end-to-end abutment with a respective one of the rear ends of said clamp arms.

7. The load-handling structure of claim 6 wherein each of said second legs of said pair of clamp arm attaching members has a connecting surface adapted for end-to-end abutment with a respective one of the rear ends of said clamp arms, each of said connecting surfaces being of elongate, vertically-extending configuration having a vertically-extending protruding central portion and a pair of vertically-extending beveled portions sloping away from said central portion on both sides thereof.

8. The load-handling structure of claim 1 or 2, wherein each of said first legs of said pair of clamp arm attaching members has a connecting surface adapted for end-to-end abutment with a respective one of said end surfaces of said elongate front portions of said slide members, each of said connecting surfaces being of elongate, vertically-extending configuration having a vertically-extending protruding central portion and a pair of vertically-extending beveled portions sloping away from said central portion on both sides thereof.

9. The load-handling structure of claim 1 or 2, wherein said slide guide frame has respective upper and lower pairs of said transverse slide guides thereon, each pair of slide guides movably mounting respective upper and lower pairs of said elongate vertically-spaced slide members, each of said clamp arm attaching members having a pair of vertically-spaced first legs each connected in end-to-end abutment with a respective end surface of one of said upper pair of slide members and one of said lower pair of slide members respectively, the forwardly-protruding second leg of each of said clamp arm attaching members extending vertically between said pair of first legs thereof and joining said pair of first legs together, said pair of first legs and said second leg being formed monolithically and homogeneously into a single member.

* * * * *